(12) United States Patent
Spille et al.

(10) Patent No.: US 10,961,049 B2
(45) Date of Patent: Mar. 30, 2021

(54) TROLLEY SYSTEM FOR COLLECTING AND COMPACTING RUBBISH IN A VEHICLE

(71) Applicant: Airbus Operations GmbH, Hamburg (DE)

(72) Inventors: Marc Spille, Hamburg (DE); Matthias Reiss, Hamburg (DE); Norbert Kaufeld, Hamburg (DE); Heinrich Hölscher, Hamburg (DE)

(73) Assignee: Airbus Operations GmbH

( * ) Notice: Subject to any disclaimer, the term of this patent is extended or adjusted under 35 U.S.C. 154(b) by 281 days.

(21) Appl. No.: 16/117,041

(22) Filed: Aug. 30, 2018

(65) Prior Publication Data

US 2019/0062047 A1 Feb. 28, 2019

(30) Foreign Application Priority Data

Aug. 30, 2017 (DE) ...................... 10 2017 119 904.7

(51) Int. Cl.
*B65F 1/14* (2006.01)
*B65F 1/00* (2006.01)
(Continued)

(52) U.S. Cl.
CPC ............ *B65F 1/1405* (2013.01); *B62B 3/003* (2013.01); *B64D 11/0007* (2013.01);
(Continued)

(58) Field of Classification Search
CPC .... B65F 1/1405; B65F 1/0013; B65F 1/0053; B65F 1/1426; B65F 1/1473; B65F 1/006;
(Continued)

(56) References Cited

U.S. PATENT DOCUMENTS 7,007,598 B1 3/2006 Patras
2011/0174170 A1* 7/2011 Fritz ..................... B65F 1/1431
100/35

(Continued)

FOREIGN PATENT DOCUMENTS

DE 10 2016 108 362 A1 11/2017
EP 2 949 459 A1 12/2015

*Primary Examiner* — Jeffrey A Shapiro
(74) *Attorney, Agent, or Firm* — Lerner, David, Littenberg, Krumholz & Mentlik, LLP

(57) ABSTRACT

A trolley system for collecting and compacting rubbish in a vehicle has a trolley housing with two chambers formed therein with respective housing openings and a rubbish compacting device. The first and second chambers, and the first and second housing openings are arranged concentrically along a main direction of extent of the housing upper side or of the housing base. The openings are arranged above the second chamber. A sliding surface is arranged below the first opening and extends from an edge of the first opening, which edge is directed towards the second opening, to an edge of the first chamber, which edge is directed towards the second chamber. The compacting device arranged above the first chamber is designed to move a pressing plate between a starting position close to the housing upper side to a position lowered in the direction of the housing base to compact rubbish within the first chamber.

15 Claims, 2 Drawing Sheets

(51) Int. Cl.
  *B64D 11/00*   (2006.01)
  *B62B 3/00*    (2006.01)
  *B64D 11/04*   (2006.01)

(52) U.S. Cl.
  CPC ............ *B64D 11/04* (2013.01); *B65F 1/0013* (2013.01); *B65F 1/0053* (2013.01); *B65F 1/1426* (2013.01); *B65F 1/1473* (2013.01); *B62B 2202/20* (2013.01); *B62B 2202/67* (2013.01); *B62B 2301/046* (2013.01)

(58) Field of Classification Search
  CPC ... B65F 1/1463; B64D 11/0007; B64D 11/04; B62B 3/003; B62B 2202/20; B62B 2202/67; B62B 2301/046
  See application file for complete search history.

(56) References Cited

U.S. PATENT DOCUMENTS

| | | | |
|---|---|---|---|
| 2011/0259213 A1 | 10/2011 | Azizi | |
| 2013/0206020 A1* | 8/2013 | Iacobucci | B30B 1/18 100/35 |
| 2015/0375937 A1* | 12/2015 | McIntosh | B65F 1/02 220/523 |
| 2016/0258188 A1* | 9/2016 | Vandewall | E05C 1/10 |

\* cited by examiner

TROLLEY SYSTEM FOR COLLECTING AND COMPACTING RUBBISH IN A VEHICLE

FIELD OF THE INVENTION

The invention relates to a trolley system for collecting and compacting rubbish in a vehicle, and to a vehicle with a passenger cabin and a trolley system located therein.

BACKGROUND OF THE INVENTION

In order to collect rubbish, use is made of trollies in vehicles for transporting people, in particular in commercial aircraft. After food and beverages have been consumed, the rubbish which arises and which often has a low density and is in the form of food and beverage containers is customarily collected into a trolley by cabin crew. The rubbish can subsequently be disposed of after the journey. Provision may also be made to dispose of the rubbish only after several missions of the vehicle and to temporarily store the rubbish until then on-board. In particular, when it is desired to provide general on-board functions in as compact a space as possible in the vehicle, in order to increase the passenger capacity thereof, the space present for disposing of or collecting or storing rubbish is also severely limited.

It is known, for the reduction of the volume of rubbish, in particular in commercial aircraft, to use compacting devices with which collected rubbish is mechanically pressed to form compact arrangements. For this purpose, it is known, for example, to use trollies with an integrated rubbish collecting container which is acted upon with the aid of a compacting device. The compacting device can have a hydraulic or pneumatic device, wherein the latter can be couplable to a vacuum system.

For example, the document EP 2 949 459 A1 discloses a rubbish compacting system which comprises a trolley with a compacting casing which is arranged on the inside, has rigid side surfaces and is compactable by air being sucked out of an interior space of the compacting casing. When the air is sucked out, the rigid side surfaces of the compacting casing move towards each other in the horizontal direction such that a compacted compacting casing which is elongate in the vertical direction and is narrow in the horizontal direction and has rubbish compressed therein arises.

BRIEF SUMMARY OF THE INVENTION

The costs for disposing of mixed rubbish may sometimes be significantly higher than the costs for separated disposal. However, the conventional trollies have virtually no possibility of realizing efficient separation and at the same time a high rubbish capacity.

An aspect of the invention proposes a trolley or the like for collecting and compacting rubbish, in which a meaningful separation of rubbish in order to save costs is also made possible.

A trolley system for collecting and compacting rubbish in a vehicle is proposed. The trolley system has a trolley housing with a housing upper side and a housing base lying opposite the housing upper side, a first chamber formed in the trolley housing and a second chamber formed in the trolley housing, a first housing opening of a housing upper side, which housing opening is connected to the first chamber, a second housing opening of a housing upper side, which housing opening is connected to the second chamber, and a rubbish compacting device. The first chamber and the second chamber and also the first housing opening and the second housing opening are arranged consecutively along a main direction of extent of the housing upper side or of the housing base. The first housing opening and the second housing opening are arranged above the second chamber. A sliding surface is arranged below the first housing opening and extends from an edge of the first housing opening, which edge is directed towards the second housing opening, to an edge of the first chamber, which edge is directed towards the second chamber. The rubbish compacting device is arranged above the first chamber and is designed to move a pressing plate between a starting position close to the housing upper side to a position lowered in the direction of the housing base and, in the process, to compact rubbish within the first chamber.

The trolley system consequently provides a trolley which is based on a conventional trolley for use in a vehicle. The trolley may also be referred as a serving trolley or transport trolley. In order to move the trolley or the trolley housing, which forms the shape of the trolley, within a cabin of the vehicle, wheels or castors are attached to the housing base. Said wheels or castors are preferably lockable in order to prevent inadvertent movement of the trolley during movements of the vehicle.

The dimensions of the trolley housing can correspond in particular to a widespread standard. For example, for use on board commercial aircraft, what is referred to as the atlas standard is very widespread. The trolley housing could correspond to what is referred to as a full-size trolley in terms of its dimensions.

The first chamber and the second chamber, which are formed in the trolley housing, can arise, for example, by division of the space volume formed in the trolley housing. In conjunction with the present disclosure, the division can take place in particular in a vertical direction, i.e. in a direction from the housing base to the housing upper side. The dimensions of the volumes of the two chambers are intended to be equal here. The first and the second chamber can each be designed as a self-contained container or can be configured to receive a container. In particular, the receiving of a separate container may be expedient in order to remove collected rubbish from the trolley housing in a simple manner.

For the filling of the first chamber and the second chamber with objects, a first housing opening and a second housing opening are provided on the housing upper side. The two housing openings do not inevitably have to correspond in their dimensions to the dimensions of an upper edge or of an individual directional extent of the associated chamber. On the contrary, all that is necessary is to permit the insertion of the rubbish through the housing openings. However, the sizes of the housing openings should be dimensioned in such a manner that the ergonomics are not restricted by the housing openings. Consequently, the cabin crew, without direct view, should be capable of comfortably inserting rubbish into the corresponding chamber.

A particular characteristic of the trolley system according to an embodiment of the invention resides in the arrangement of the sliding surface between the first housing opening and the first chamber. Said sliding surface permits the gravity-assisted introduction of rubbish into the first chamber. After the rubbish is inserted into the first housing opening, the rubbish slides on the sliding surface into the first chamber and remains there. Consequently, the inclination of the sliding surface should be dimensioned in such a manner that the rubbish can slide into the first chamber satisfactorily and without subsequent pushing or a similar operation.

The positioning of the first housing opening and of the sliding surface permits the arranging of the rubbish compacting device directly above the first chamber, and therefore rubbish located therein is compacted by an action of force from above the first chamber. The sliding surface consequently compensates for the lateral offset between the arrangement of the first chamber and of the first housing opening.

The combination of the first housing opening, the second housing opening, the sliding surface and the rubbish compacting device consequently leads to a particularly compact configuration of two rubbish containers which are separate from each other and with which waste can be sorted and separated without having to dispense with space-saving compaction. Spatial volume for storing rubbish is therefore saved and the costs for the disposal of the rubbish reduced.

The type and design of the rubbish compacting device are insignificant to the success of the trolley system according to an embodiment of the invention. The rubbish compacting device does not have to be fully integrated in the trolley housing, but rather the rubbish compacting device can also be arranged in a corresponding parking space, into which the trolley can be pushed. Furthermore, the specific design of the rubbish compacting device can be as desired, for example can have a pressing plate movable by a pneumatic or hydraulic actuator. The actuator can have, for example, an expansion bellows which is deflected into the first chamber during evacuation of the first chamber, which is closed in an air-tight manner during evacuation, and in the event of a fluid connection of an interior space of the expansion bellows with the surroundings of the trolley. In addition, such a vacuum compacting device can be connected to an independent device for generating a vacuum, or alternatively or additionally thereto, can also be connected to a vacuum system already located on-board the vehicle. This is appropriate in particular in commercial aircraft in which a multi-functional monument arrangement is selected in which toilet and kitchen functions are present in different modules. On-board toilets in particular in commercial aircraft are provided with a vacuum system, with the aid of which the contents of the on-board toilet are removed into a black water tank.

In an advantageous embodiment, a first closure is arranged on the first housing opening and is designed to close the first housing opening in an air-tight manner in order to evacuate the first chamber. This can be expedient in particular when the rubbish compacting device is fully integrated in the form of a vacuum compacting device into the trolley housing. In the event of such, it is conceivable to evacuate a volume in the interior of the trolley housing such that a pressing plate, which is arranged on an expansion bellows or the like, is pressed into said volume when the interior of the expansion bellows is connected to the ambient air of the trolley housing. In the event of such an integration, the first housing opening therefore has to be closed in an air-tight manner. During the design of the trolley, care consequently has to be taken to ensure that the volume bounded by the first chamber, the sliding surface and the first housing opening can be closed to the outside in an air-tight manner.

It is particularly preferred that the first closure is in the form of a pivotable or displaceable flap. The latter could furthermore be lockable in at least one closed position in order, during an evacuation process, to prevent the first housing opening from inadvertently opening. This can preferably be undertaken by means of a latching mechanism which latches during the closing of the first closure and subsequently has to be released again manually.

It is particularly advantageous if the first closure is arranged on an outer side of the first housing opening, and therefore the first closure is pressed onto the first housing opening because of the arising differential pressure upon evacuation of the first chamber. The effectiveness of the seal can thereby be additionally improved without the operability of the first closure being impeded.

In a preferred embodiment, a first lateral removal opening is provided in the trolley housing, which removal opening is closable in an air-tight manner in order to evacuate the first chamber and is designed to remove rubbish laterally from the first chamber. By means of the arrangement of the rubbish compacting device above the first chamber, it is particularly advantageous to carry out removal of the rubbish via a lateral access. The term "lateral" can mean an arrangement on the end side or else on the longitudinal side. The first lateral removal opening can be dimensioned, for example, in order to be able to introduce a container, which is correspondingly shaped with the first chamber, into the first chamber or to be able to remove same from there. Accordingly, the first lateral removal opening should have dimensions which correspond to a corresponding lateral contour of such a container. The first chamber can have slide rails on which the container can be pushed into the first chamber. Should, however, the first chamber be provided only for the purpose of receiving a rubbish bag, the first lateral removal opening can be adapted thereto. It is furthermore not necessary to dimension the first lateral removal opening in such a manner that, in its unclosed state, the rubbish compacting device is accessible. Consequently, preferably only part of a corresponding housing side close to the housing base is provided with an opening. The first lateral removal opening is preferably closable via a flap or a door.

The first lateral removal opening is particularly advantageously closable by a first side flap which is pivotable about an axis arranged perpendicularly to the housing base. Said side flap can be pivoted open outwards in order to ensure its function. During the closing of the side flap, the latter preferably strikes against a stop which is arranged on the trolley housing. The stop can be realized, for example, by an encircling frame in which the first side flap can be positioned flush. This can be used in turn to the effect that, during the evacuating of the first chamber when a vacuum compacting device is used, the first side flap is pressed against the stop because of the negative pressure which then arises, which consequently improves the sealing action. The stop or the encircling frame is preferably provided with a sealing element.

In a further embodiment, a sliding flap which is mounted pivotably about a horizontal axis is arranged on a side surface of the trolley housing below the housing upper side and is designed so as, in a first position, to close an upper lateral pouring-in opening in the trolley housing, which pouring-in opening is connected to the first chamber, in an air-tight manner and, in a second position, to provide a second sliding surface for guiding rubbish into the first chamber.

The sliding flap can be located, for example, in a portion of the trolley housing that lies above the first lateral removal opening and is consequently positioned to the side of the rubbish compacting device. By means of the sliding flap, a second sliding surface can be provided which permits the very convenient insertion of rubbish laterally into the trolley housing or the first chamber. This is particularly expedient if rubbish is to be received in a stationary position. The trolley housing or the trolley can be located in a corresponding parking place and locked there. In this state, the sliding flap can be brought into its second position. During prolonged intended use, it can be provided to lock the sliding flap in its second position. Alternatively or additionally thereto, the sliding flap can also remain in the second position because of gravity. The sliding flap can have a handle for movement purposes. The first chamber is filled in the second position of the sliding flap by rubbish being introduced laterally above the sliding flap into the first chamber. During such a use, it should be ensured that the rubbish compacting device is in its retracted position such that the insertion of rubbish is not impeded. Furthermore, it is expedient to ensure that the lateral insertion opening produced by the sliding flap is always located below the rubbish compacting device in order to prevent damage thereof.

The sliding flap is preferably located between the housing upper side and the first lateral removal opening. This can be, for example, on an end-side surface of the trolley housing. In particular, in commercial aircraft, it is frequently desired to store trollies in parking places in which only one end surface is accessible from outside the parking place. The first lateral removal opening and the sliding flap would then be accessible in the end side and permit the prior locking of the trolley in a corresponding parking place.

As an alternative to the sliding flap, instead of being pivotable about a vertical axis the first side flap can also be pivotable about a horizontal axis arranged on the floor side. Consequently, the first side flap can be pivoted open outwards by a certain degree by movement of its upper edge, thus resulting in an insertion possibility from above to the side of the trolley. Accordingly, such an arrangement can permit a type of chute. It is conceivable to be able to lock the degree of pivoting of the first side flap in this configuration in a position in order to be able to use it for the insertion of rubbish. The container can be removed by further pivoting open, moving away or other opening of the first side flap.

Analogously to the first lateral removal opening, the trolley housing can have a second lateral removal opening which is closable in an air-tight manner and is designed to remove rubbish laterally from the second chamber. The term "laterally" can also include here both on the end side and on the longitudinal side, depending on desire or requirement. Consequently, the trolley housing can have a second side flap or a laterally arranged door which opens up the second chamber such that rubbish can be removed from there.

Furthermore, the trolley system can have at least one fluid container arranged on the trolley housing for receiving liquids, said fluid container being connected to a drain arranged on the trolley housing. It has been found during the collecting of rubbish in a cabin of a vehicle that beverage containers which have been given out are not returned empty but rather contain beverage residues. If it is intended to dispose of the beverage cups, it is highly advantageous not to dispose of the beverage residues together with the cup, but rather to pour them into the at least one separate fluid container. Furthermore, a plurality of fluid containers of this type can be provided which are provided separately per se or in combination with one another. The drain via which the liquids are removed can be connected to the at least one fluid container by a pipe or a tube. Alternatively thereto, the fluid container can also have a dedicated drain. If a plurality of fluid containers are used, they can preferably be designed to be rapidly interchangeable, and therefore a filled fluid container can be changed for an empty fluid container. The at least one fluid container is intended preferably to be able to be positioned or secured on the trolley housing in such a manner that the drain is fitted as far as possible at an ergonomic height of the trolley housing. This can be, for example, in a region close to the housing upper side, at which the handles of the trolley are preferably also arranged.

The at least one fluid container can be arranged on an outer side of a second side flap closing a second lateral removal opening, wherein the second lateral removal opening is designed to remove rubbish laterally from the second chamber. The functionality of the second side flap is upgraded by the integration of the at least one fluid container, and therefore a separate construction space is not needed therefor. The at least one fluid container is preferably relatively flat, and therefore the structure of the second side flap does not significantly increase.

Furthermore, a third chamber can be provided which is shaped substantially cylindrically and is designed to receive beverage cups, which are introduced into a third housing opening of the housing upper side, in the form of a stack of beverage cups. Since beverage cups can be comparatively easily stacked, compaction can be achieved by the stacking itself. The use of the compacting device is therefore not necessary and the first chamber can accordingly receive a greater quantity of different rubbish. Furthermore, predominantly only beverage cups having one or two different materials are used on-board a vehicle, and therefore additional sorting of the rubbish takes place by means of the third chamber. In particular, when the at least one fluid container is integrated in the second side flap, it may be expedient likewise to arrange the third chamber in the second side flap.

As outlined above, the waste compacting device can be designed as a vacuum compacting device which is integrated in the trolley housing. Alternatively thereto, the waste compacting device can also be provided separately from the trolley housing and can be designed to be integrated into a trolley parking place.

The trolley system can consequently be part of a cabin monument, wherein the waste compacting device can be integrated into the monument. The monument can furthermore have a parking place for a trolley, into which a trolley formed by the trolley system according to an embodiment of the invention can be inserted. When the waste compacting device is relocated into the cabin monument, the available volume in the first chamber could be increased.

Furthermore, the invention relates to a vehicle which has a cabin and is provided with a trolley system according to an embodiment of the invention.

BRIEF DESCRIPTION OF THE DRAWINGS

Further features, advantages and use possibilities of the present invention emerge from the description below of the exemplary embodiments and the figures. All of the described and/or pictorially illustrated features here form the subject matter of the invention by themselves in any combination also irrespective of their composition in the individual claims or the dependency references thereof. Furthermore, the same reference signs represent identical or similar objects in the figures.

DETAILED ILLUSTRATION OF EXEMPLARY EMBODIMENTS

Figure 1:
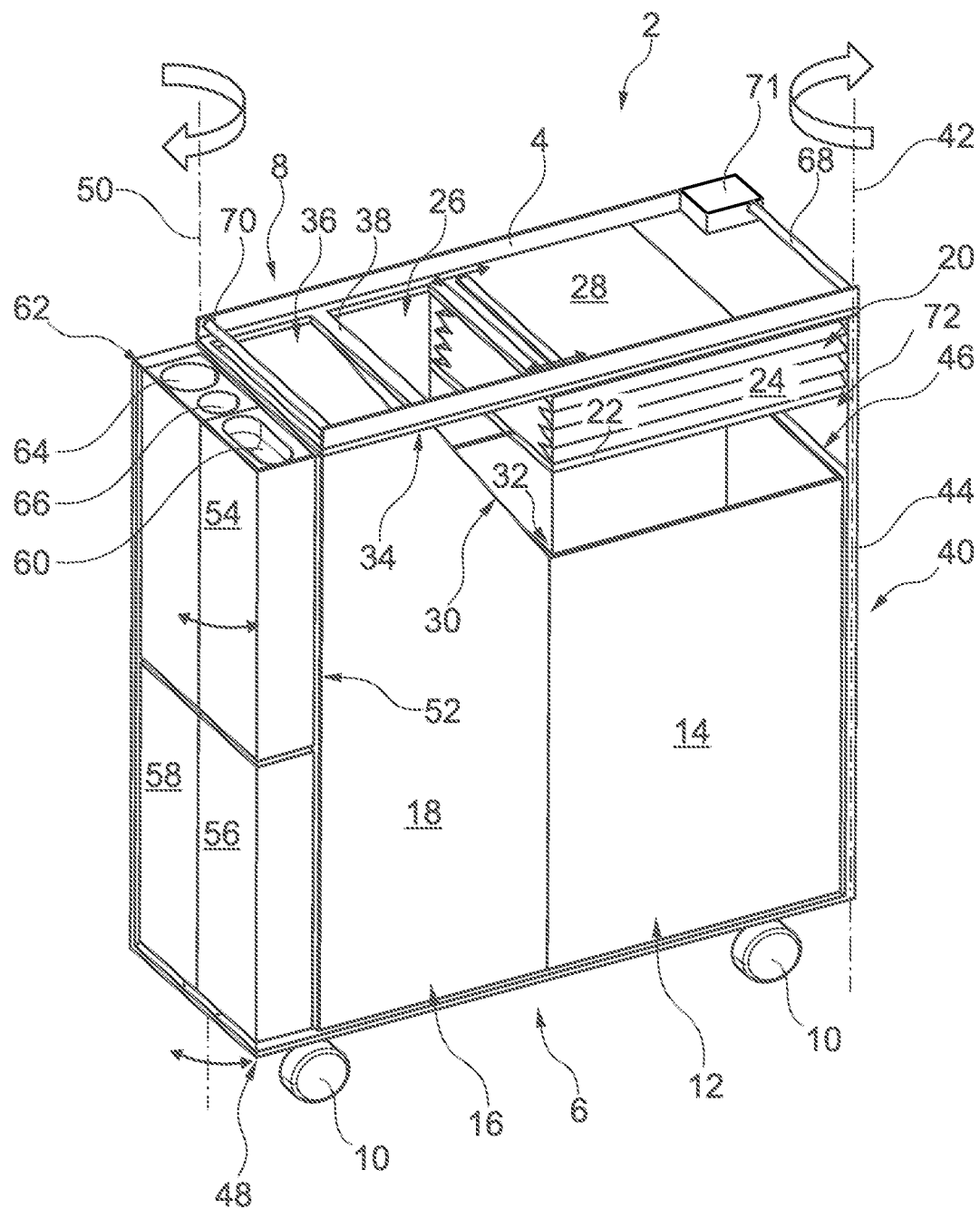
FIG. 1 shows a trolley system in a three-dimensional view.

FIG. 1 shows a trolley 2 or a trolley system 2 in a three-dimensional illustration. The terms of trolley and trolley system should be understood substantially as synonyms since the trolley is equipped by a multiplicity of components which interact with one another and together result in a system. In the case of the modification mentioned further below with a rubbish compacting device which is arranged in a different unit but which interacts with the other components within the trolley housing, the term trolley system is overall more appropriate.

The trolley 2 has a housing 4 which has a housing base 6 and a housing upper side 8. The actual design of the trolley housing 4 can differ from the illustration which is merely shown schematically here. The trolley housing 4 can be designed, for example, in the form of a frame with cladding panels, but this is not significant for the invention.

In particular, for use in a commercially used vehicle, it is appropriate to meet customary standards with the external dimensions of the trolley housing 4. Accordingly, in the illustration shown, the trolley 2 has outwardly closed surfaces and substantially corresponds to a full size trolley of atlas standard or to a similar widespread standard. Castors 10 are attached to the housing base 6 and permit simple movement of the trolley 2 in the vehicle. Although it is not explicitly illustrated here, at least one of the castors 10 can be lockable.

A first chamber 12 is formed in the interior of the trolley housing 4, in which a container 14 open to the housing upper side 8 for collecting rubbish is arranged. Furthermore, a second chamber 16 is formed in the trolley housing 4, which chamber is adjacent to the first chamber 12 and, in this illustration, likewise has a container 18 which is open towards the housing upper side 8.

A waste compacting device 20 which is designed as a vacuum compacting device is arranged above the first chamber 12. Said waste compacting device has, by way of example, a rigid, flat pressing plate 22 which is arranged on the housing upper side 8 via an expansion bellows 24 so as to be movable in a vertical direction, that is to say towards the housing upper side 8 or towards the first chamber 12. More precise details will be explained further below.

A first housing opening 26 is arranged on the housing upper side 8, which housing opening is closable via a first closure 28, which is designed as a displaceable flap. The first housing opening 26 is offset laterally somewhat from the first chamber 12, and therefore the first housing opening 26 in this example is arranged exclusively above the second chamber 16. A lower side of the first housing opening 26 is adjoined by a sliding surface 30 which leads from a side edge 32 of the first chamber 12 or of the first container 14, which side edge is directed towards the second chamber 16, to a side edge 34 of the first housing opening 26, which side edge faces away from the first chamber 12. Waste which is thrown through the first housing opening 26 consequently slides on the first sliding surface 30 into the first chamber 12 in order to be received there by the container 14.

A second housing opening 34 is located on a side of the first housing opening 26 that faces away from the first chamber 12, said second housing opening likewise being located above the first chamber 16. Waste which is inserted through said second housing opening 36 is consequently conducted into the second chamber 16 or into the container 18 arranged therein. The first housing opening 26 and the second housing opening 36 are separated from each other by a web 38. The first housing opening 26, the second housing opening 36 and the web 38 overall have a surface of extent which is somewhat smaller than the surface of extent of a floor of the second chamber 16 directly above the housing base 6.

A first lateral access opening 40 which is closable via a first side flap 44 is located on the end side on a side of the first chamber 12 that faces away from the second chamber 16. Said side flap is pivotable about a first vertical axis 42. An upper edge 46 of the first side flap 44 is located approximately level with the upper edge 32 of the first container 14 or the lower end of the sliding surface 30. By opening of the first side flap 44, the container 14 can be removed from the first chamber 12 or inserted here. For the sake of simplicity, sliding or holding rails which are possibly provided are not illustrated here. Located above the first side flap 44, by way of example, is a sliding flap 72 which can be opened for the insertion of rubbish and can be closed in an air-tight manner for evacuating the first chamber 12. This is explained in more detail with reference to FIG. 2.

The second container 18 or the second chamber 16 extends as far as the housing upper side 8 and has an opening cross section tapering to the housing upper side 8, in order to form the sliding surface 30. The second chamber 16 is accessible through a second side flap 48 which is pivotable about a second vertical axis 50. The second container 18 can be removed on the end side from the trolley housing 4 through a second lateral access opening 52.

In this example, the second side flap 48 has three fluid containers 54, 56 and 58 which are each connected to a drain 60 on an upper side 62 of the second flap 48. In the example shown, each of the three fluid containers has an integrated drain 60. The uppermost fluid container in each case, the drain 60 of which lies in the region of the housing upper side 8, is used for receiving liquid rubbish. If said fluid container should then be full, it can be changed for another fluid container which is still empty in the second side flap 48.

In addition, two third chambers 64 and 66 are arranged in the second side flap 48, are of substantially cylindrical design and extend substantially perpendicularly, that is to say parallel to the first vertical axis 42 or the second vertical axis 50, in the second side flap 48. Said chambers serve to receive beverage containers, for example plastic cups, in a stacked manner. Plastic cups which are not entirely empty can be emptied through the drain 60 into one of the fluid containers 54, 56 and 58 in order subsequently then to be stacked in one of the third containers 64 and 66. It is appropriate to provide two separate third chambers 64 and 66 in order to collect two different types of beverage cup separately. For example, said chambers can be produced from a material suitable for hot beverages or for cold beverages.

The trolley 2 furthermore has two handles 68 and 70 in order to be conveniently moved in a cabin of a vehicle. The housing openings 26 and 36, the third chambers 64 and 66 and the respective drain 60 are arranged approximately level with the handles 68 and 70 and are therefore positioned highly ergonomically.

Figure 2:
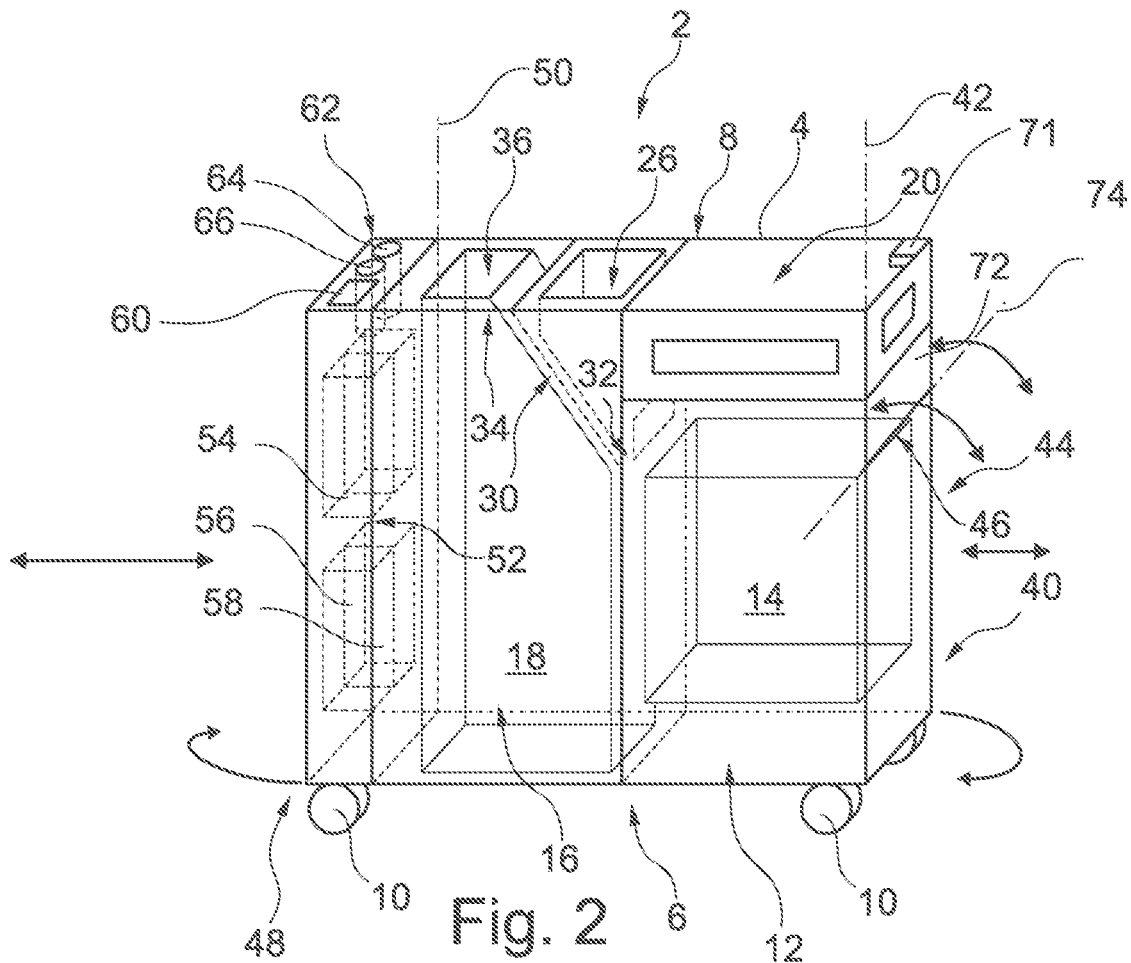
FIG. 2 shows the trolley system in a partially sectioned three-dimensional view.

In a somewhat rotated view in FIG. 2, the same components are shown once again from a different perspective. A sliding flap 72 which is located above the first side flap 44 and is movable about a horizontal axis 74 is in particular obvious here. The horizontal axis 74 is positioned at an end of the sliding flap 72 which faces away from the housing upper side 8, and therefore, when the sliding flap 72 is pivoted, the upper end thereof moves outwards. By this means, a second sliding surface can be produced, through which rubbish can be conducted into the first chamber 12.

This is expedient in particular if the trolley 2 is located in a parking place, for example of a kitchen monument or the like, and is intended to be used in a stationary manner for collecting rubbish. The trolley 2 is then preferably locked in the parking place and only the sliding flap 72 projects outwards beyond the parking place. Of course, the sliding flap 72 should be realized in such a manner that it likewise closes in an air-tight manner so that a movement of a pressing plate 22 or the like can take place during a compacting process with associated evacuation of the first chamber 12.

For connection to a vacuum system in or at a parking place for the trolley 2, the trolley 2 can have a rapid-acting coupling 71 which is arranged by way of example on the upper side 8 of the trolley. The rapid-acting coupling 71 can engage mechanically in a corresponding coupling, for example by pushing the trolley 2 into a parking place. As a result, a fluid connection is made between a vacuum system and the trolley 2, wherein the actual sucking out of air, i.e. the evacuation of the first chamber 12, can take place by opening of a valve (not shown here).

As an alternative to the illustration realized in FIGS. 1 and 2, the rubbish compacting device 20 can also be arranged in a cabin monument, for example directly above a parking place provided for the trolley 2. The first chamber 12 could therefore possibly also be somewhat enlarged.

Figure 3:
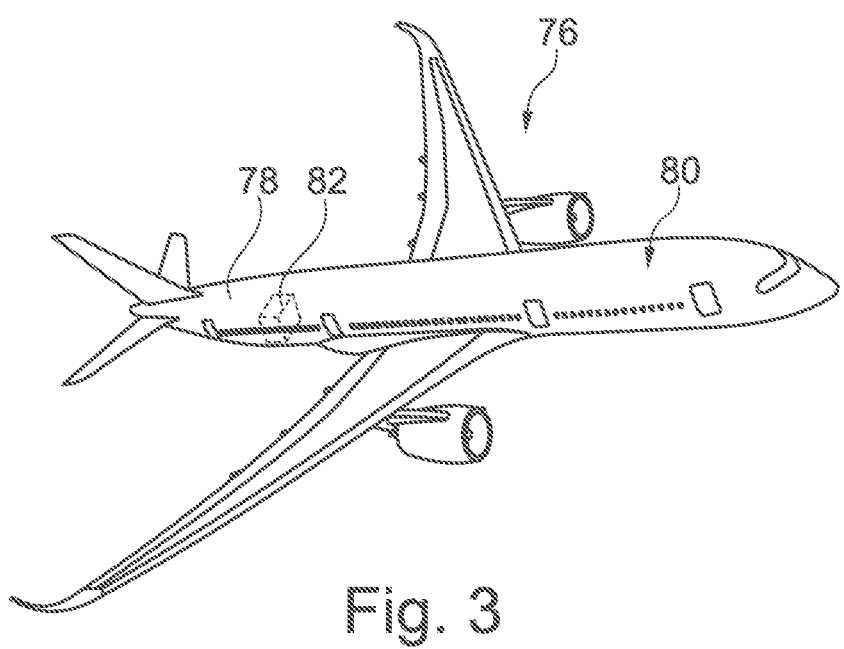
FIG. 3 shows an aircraft which is provided with a cabin and a trolley system located therein.

FIG. 3 illustrates an aircraft 76 with an aircraft fuselage 78, a cabin 80 formed therein and a cabin monument 82 located therein. The cabin monument 82 has a parking place which is designed for receiving a trolley 2.

It should also be noted that "having" does not exclude any other elements or steps, and "a" does not exclude a multiplicity. Furthermore, it should be noted that features which have been described with reference to one of the above exemplary embodiments can also be used in combination with other features of other exemplary embodiments described above. Reference signs in the claims should not be considered to be a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trolley system for collecting and compacting rubbish in a vehicle, the trolley system comprising:
   a trolley housing with a housing upper side and a housing base lying opposite the housing upper side, the housing upper side and the housing base extending along a longitudinal axis;
   a first chamber formed in the trolley housing and a second chamber formed in the trolley housing;
   a first housing opening on the housing upper side, the first housing opening connected to the first chamber, and a second housing opening on the housing upper side, the second housing opening connected to the second chamber; and
   a rubbish compacting device,
   wherein the first chamber and the second chamber and the first housing opening and the second housing opening are arranged consecutively along the longitudinal axis,
   wherein the first housing opening and the second housing opening are arranged above the second chamber,
   wherein a sliding surface is arranged below the first housing opening and extends from a first edge of the first housing opening, the first edge directed towards the second housing opening, to a second edge of the first chamber, the second edge directed towards the second chamber, and
   wherein the rubbish compacting device is arranged above the first chamber and is configured to move a pressing plate between a starting position close to the housing upper side to a position lowered in the direction of the housing base and, in the process, to compact rubbish within the first chamber.

2. The trolley system according to claim 1, wherein a first closure is arranged on the first housing opening and is configured to close the first housing opening in an air-tight manner in order to evacuate the first chamber.

3. The trolley system according to claim 2, wherein the first closure comprises a pivotable or displaceable flap.

4. The trolley system according to claim 1, further comprising a first lateral removal opening in the trolley housing, the first lateral removal opening being closable in an air-tight manner in order to evacuate the first chamber and being configured to remove rubbish laterally from the first chamber.

5. The trolley system according to claim 4, wherein the first lateral removal opening is closable by a first side flap mounted pivotably about an axis arranged perpendicularly to the housing base.

6. The trolley system according to claim 1, further comprising a sliding flap mounted pivotably about a horizontal axis and arranged on a side surface of the trolley housing below the housing upper side, the sliding flap configured so as, in a first position, to close an upper lateral pouring-in opening in the trolley housing, the upper lateral pouring-in opening connected to the first chamber, in an air-tight manner and, in a second position, to provide a second sliding surface for guiding rubbish into the first chamber.

7. The trolley system according to claim 6, wherein the sliding flap is arranged in a portion of the trolley housing that lies above the first lateral removal opening and is positioned to the side of the rubbish compacting device.

8. The trolley system according to claim 1, further comprising at least one fluid container arranged on the trolley housing for receiving liquids, said fluid container connected to a drain.

9. The trolley system according to claim 8, wherein the at least one fluid container is arranged on an outer side of a side flap closing a second lateral removal opening, wherein the second lateral removal opening is configured to remove rubbish laterally from the second chamber.

10. The trolley system according to claim 1, further comprising at least one third chamber shaped substantially cylindrically and configured to receive beverage cups, which are introduced into a third housing opening on the housing upper side, in the form of a stack of beverage cups.

11. The trolley system according to claim 1, wherein the rubbish compacting device is configured as a vacuum compacting device integrated in the trolley housing.

12. The trolley system according to claim 1, wherein the rubbish compacting device is provided separately from the trolley housing and is configured to be integrated into a trolley parking place.

13. A vehicle, having a fuselage, a cabin formed therein and a trolley system according to claim 1.

14. The vehicle according to claim 13, wherein the vehicle comprises a commercial aircraft.

15. The vehicle according to claim 13, further comprising a cabin monument with a trolley parking place formed therein for receiving a trolley which is formed by the trolley system.

\* \* \* \* \*